July 7, 1931.　　　J. R. OGDEN, JR　　　1,813,757
VEHICLE SPRING SUSPENSION
Filed Sept. 30, 1927　　　2 Sheets-Sheet 1
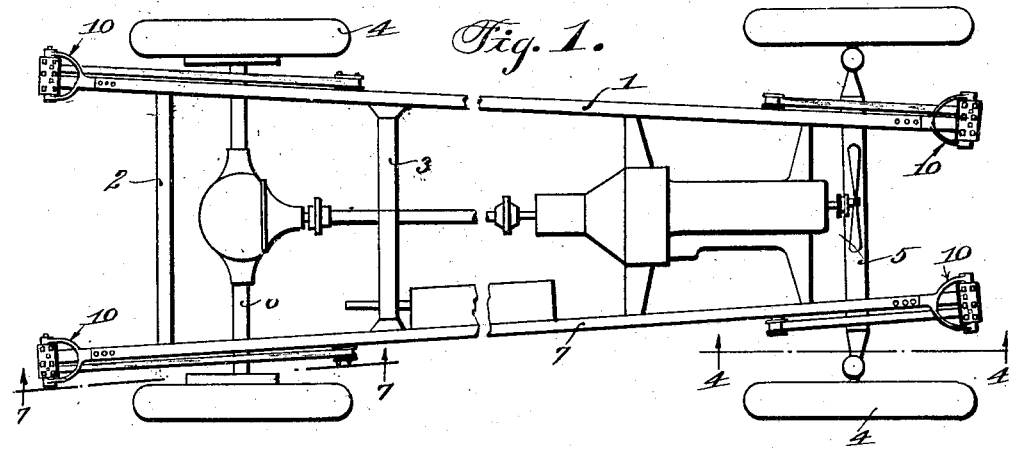
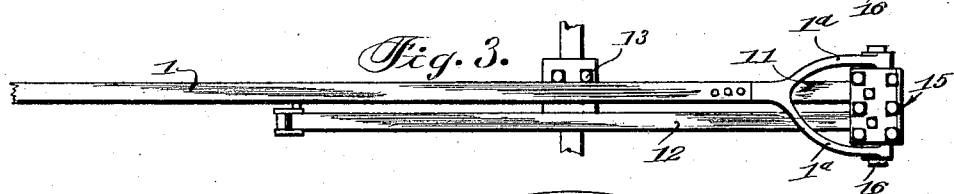
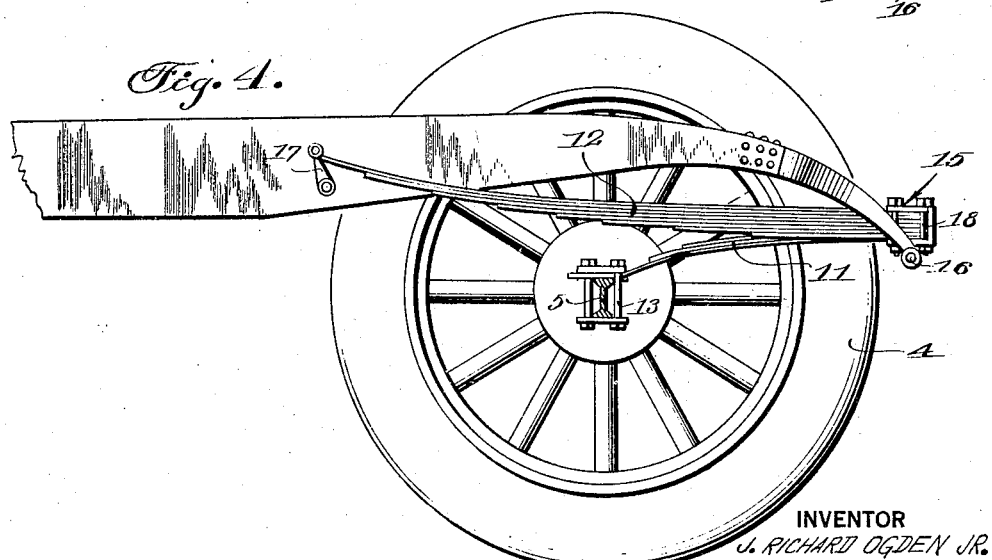
INVENTOR
J. RICHARD OGDEN JR.
BY
ATTORNEY July 7, 1931.  J. R. OGDEN, JR  1,813,757
VEHICLE SPRING SUSPENSION
Filed Sept. 30, 1927  2 Sheets-Sheet 2
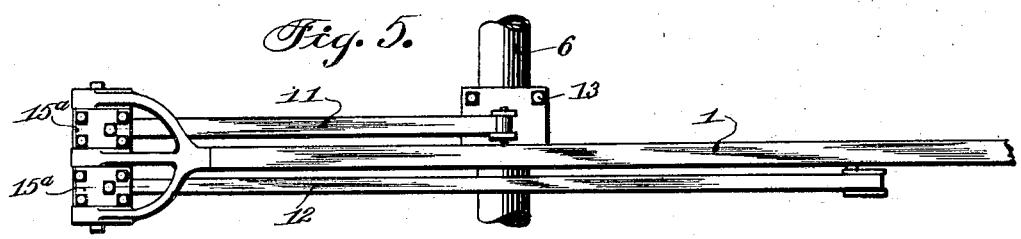
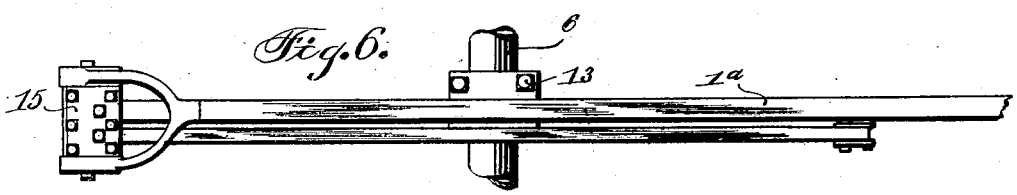
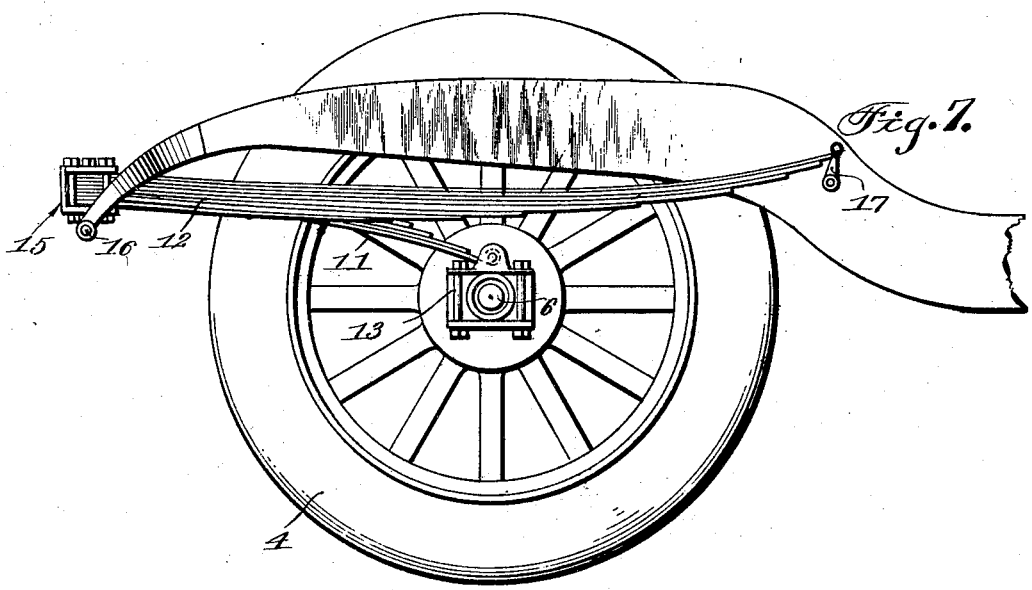
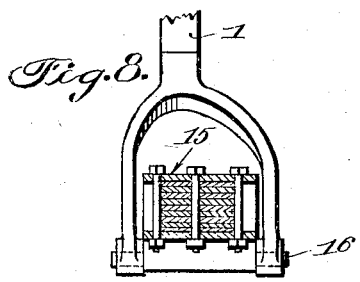
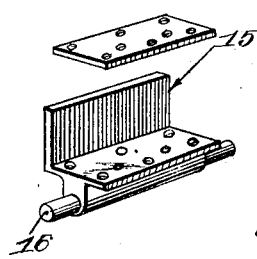
INVENTOR
J. RICHARD OGDEN JR.
BY
ATTORNEY Patented July 7, 1931

1,813,757

UNITED STATES PATENT OFFICE

JOSEPH RICHARD OGDEN, JR., OF ATLANTIC CITY, NEW JERSEY

VEHICLE SPRING SUSPENSION

Application filed September 30, 1927. Serial No. 223,104.

This invention relates to spring suspensions for motor vehicles.

A primary object of the invention is to so construct a vehicle spring suspension that the distance between the points of the chassis support will be increased without increasing the wheel base, and at the same time maintain the advantages of the old cantilever type of spring suspension.

Another object of the invention is to provide a vehicle spring suspension having its central point of support nearer the extreme length of the vehicle than the placing of the axle.

Another object is to provide a vehicle spring suspension in which two springs are rigidly fastened to each other at one end and which operate as a single cantilever spring.

Another object is to so mount the spring in relation to the chassis that all excess motion is eliminated and also the consequent noise and wear.

In carrying out these objects, the invention is susceptible of a wide range of modification without departing from the spirit or sacrificing any of the advantages of the claimed invention; there being shown in the drawings for illustrative purposes a preferred and practical form, in which;

Figure 1 represents a top plan view of a vehicle chassis with this improved spring shown applied, parts of the chassis being broken out for convenience in illustration, Fig. 2 is a detail plan view showing one form of housing for mounting the spring on the chassis, Fig. 3 is a similar view showing a slightly different form of housing, Fig. 4 is a longitudinal section taken on the line 4—4 of Fig. 1 with the spring suspension shown in side elevation, Figs. 5 and 6 are views similar to those shown in Figs. 2 and 3 illustrating the connection of the rear spring with the chassis, Fig. 7 is a longitudinal section taken on the line 7—7 of Fig. 1, with the rear spring shown in side elevation, Fig. 8 is a detail transverse section taken on the line 8—8 of Fig. 7, and Fig. 9 is a detail perspective view of one of the housings shown for connecting the long and short arms of the spring.

In the embodiment illustrated an automobile chassis is shown including the usual side bars 1 connected by cross bars 2 and 3 in the usual manner and mounted on the ordinary wheels 4, the front axle being shown at 5 and the rear axle at 6. The side bars 1 of the chassis are shown extended at their front and rear ends some distance in advance of the front and rear axles and the chassis is supported on the axles by means of the spring suspension constituting this invention, and which is so constructed and connected as to increase the distance between points of the chassis support without increasing the wheel base, and which maintains the advantages of the old cantilever type of spring suspension. This is accomplished by providing four spring suspensions indicated generally at 10 and located one at each corner of the chassis.

Each of these suspension springs is composed of a short arm 11 and a long arm 12, the short arm at the front of the vehicle being fastened to the front axle by a shackle 13 while the long arm is fastened at its inner end to the vehicle frame. The short arm 11 of each suspension spring is rigidly attached to a rigid housing 15 which is pivotally connected at 16 to the terminal of the side bar 1, the outer end of the long arm 12 of the spring also being rigidly fastened to the housing 15 so that it will be seen that the ends of the two spring arms are rigidly connected with each other and pivotally connected with the chassis.

The rear end of the long arm 12 is connected by a freely moving shackle 17 to the outer face of the chassis bar 1 as is shown clearly in Figs. 4 and 7. This construction will, by means of the short arm 11, reduce side swaying and being more rigid will take up severe jolts of the road, while the long spring arm 12 by principles of leverage, will be less stiff than the short arm and therefore absorb the smaller shocks of the road.

It will be seen that the pivot pins 16 constitute the points of support, and improved riding qualities of a longer wheel-base vehicle will be provided. The rigid housing 15 may be supported on each end or may be supported at each end and the center by fastening each spring housing to the shaft supporting them and making the supports in the form of bearings.

It will thus be seen that the lower arm 11 on the spring suspension member 10 is connected at its inner end above the axle in connection with which it is used and the chassis bearing 16 is located under the housing 15. This arrangement provides for the running of the short or lower arm 11 underneath the frame 1 of the chassis with the upper long arm 12 arranged alongside the lower or short arm.

By constructing the member 10 of two arms a cheaper construction is provided and a long upper arm may be used without raising the center of gravity of the chassis or changing in any way the design of the frame in connection with which it is to be used.

The rigid connection of the two spring arms not at the apex of the spring dispenses with excess motion and eliminates wear and noise. This is due to the fact that the revolving around the bearing at the apex causes a pulling motion which affects the spring.

The raising and lowering of the rear wheels of the vehicle causes a slight rearward motion of the axle produced by the torque tube or radius rod, and by having the bottom spring arm 11 enter the spring housing horizontally and having a slightly curved spring fastening to the axle on a pin bearing prevents great forward motion and the friction incident thereto. The rearward motion of the axle is compensated for by the rearward motion of the rising spring working about the pin bearing 16 as a radius. This slight rearward motion is transferred to the upper spring arm 12 which transfers it to the forward sloping shackle 17 without impairing the spring action.

This suspension spring when used on the front axle of a vehicle allows the axle to rise exactly vertically which has never heretofore been done with a cantilever spring.

In Figs. 3 and 6 the housing is shown in one piece and the front or bifurcated end of the chassis bar 1 has the arms 1a thereof located at the ends of said housing and pivotally connected with the pivot 16 thereof. In Figs. 2 and 5 the housing is made in two parts 15a, and each of which is fixed to the spring members 11 and 12. The end of the chassis to which the housings are attached has three tines instead of two. The springs, or rather the arms 11 and 12 thereof, are shown rigidly secured to the housing by bolts 18.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A vehicle spring suspension comprising two leaf springs rigidly attached together at one end and arranged side by side in parallel planes, one of said leaves being longer than the other and connected at its free end with the vehicle chassis, the free end of the shorter spring being pivotally connected with the vehicle axle.

2. A vehicle spring suspension comprising two springs rigidly attached together at one end and arranged side by side in the same plane of said connected ends, one curving upwardly toward its free end and the other downwardly, the upwardly curved spring being long and flexible and the lower spring short and stiff whereby all small jolts of the road are absorbed by the former and the more severe jolts by the latter.

3. The combination with a vehicle chassis having the side bars thereof extended at their ends in advance of the axles of the vehicle and turned downwardly; of a spring suspension mounted at each corner of the chassis and each comprising a pair of leaf springs rigidly fastened to each other at one end and pivotally mounted on the projecting end of the chassis side bar in a plane below said chassis, one of the said leaves being longer than the other and pivotally connected at its free end to the chassis at a point spaced inwardly from the axle, the other spring being shorter than the first mentioned spring and pivotally connected with the axle in a plane above it, the inner end of the long spring being connected with the chassis by upwardly and inwardly sloping shackle whereby rearward motion of the axle is compensated for by the rearward motion of the rising spring working about the bearing and its connection with the chassis as a radius, and transferring said motion to the upper spring arm and through it to the sloping shackle without impairing the spring action.

4. The combination with a vehicle chassis having the side bars thereof extended at their ends in advance of the axles of the vehicle, a spring suspension mounted at each corner of the chassis and each comprising a housing having a chassis bearing under it and pivotally connected with the chassis, a pair of leaf springs having one end of each arranged side by side and rigidly fastened together and to the housing, one of said springs being arranged underneath the chassis and pivotally connected at its free end with the axle in a plane above it, the other arm extending inwardly beyond the axle and pivotally connected with the chassis, said springs being arranged side by side for a portion of their length.

5. The combination with a vehicle chassis having the side bars thereof extending at their ends in advance of the axles of the vehicle, said ends being bifurcated, a spring suspension mounted at each corner of the chassis, a housing for each suspension mounted between the furcations of the chassis end and pivotally connected below the housing with said end the suspension including a pair of leaf springs rigidly fastened to each other at one end and extended horizontally into the housing and fixedly secured thereto, one of said springs being curved downwardly and pivotally connected at its free end with the axle in a plane above it, while the other curves upwardly toward its free end and is pivotally connected with the chassis.

6. The combination with a vehicle chassis having the side bars thereof extended at their ends in advance of the axles of the vehicle, said ends being downturned and bifurcated, a spring housing mounted between the furcations of each end and pivotally connected therewith at the bottom of the housing, a spring suspension mounted in each corner of the chassis and each including a pair of leaf springs with their ends arranged side by side in said housing and rigidly secured together and to the housing, one of said springs being longer than the other and extended inwardly and connected at its free end with the chassis, the shorter spring extending downwardly, and a connector carried by the axle and pivotally connected at its upper end with the free end of the short spring.

7. A vehicle spring suspension comprising two leaf springs arranged side by side and rigidly fastened together at one end, one of said springs being pivotally connected at its other end with the vehicle chassis and the free end of the other spring connected with the axle.

8. In a vehicle spring suspension a chassis side member having a downturned forked end, a suspension spring extending longitudinally beneath the side member and having one end supported in the forked end and its opposite end adapted for connection to a part of a chassis, a second spring arranged to one side of the first mentioned spring with one end anchored in the forked end of the chassis side member and its opposite end downwardly curved and attachable to a motor vehicle axle.

JOSEPH RICHARD OGDEN, Jr.